(12) United States Patent
Luo et al.

(10) Patent No.: US 12,356,150 B2
(45) Date of Patent: Jul. 8, 2025

(54) SYSTEMS AND METHODS FOR OWN VOICE DETECTION IN A HEARING SYSTEM

(71) Applicant: SONOVA AG, Staefa (CH)

(72) Inventors: Henry Luo, Surrey (CA); Ara Talaslian, Cambridge (CA)

(73) Assignee: Sonova AG, Staefa (CH)

( * ) Notice: Subject to any disclaimer, the term of this patent is extended or adjusted under 35 U.S.C. 154(b) by 227 days.

(21) Appl. No.: 18/036,523

(22) PCT Filed: Nov. 30, 2020

(86) PCT No.: PCT/IB2020/061290
§ 371 (c)(1),
(2) Date: May 11, 2023

(87) PCT Pub. No.: WO2022/112834
PCT Pub. Date: Jun. 2, 2022

(65) Prior Publication Data
US 2023/0421974 A1 Dec. 28, 2023

(51) Int. Cl.
*H04R 25/00* (2006.01)
*G10L 17/26* (2013.01)
(Continued)

(52) U.S. Cl.
CPC ........... *H04R 25/505* (2013.01); *G10L 17/26* (2013.01); *G10L 25/21* (2013.01); *G10L 25/51* (2013.01);
(Continued)

(58) Field of Classification Search
CPC .... H04R 25/505; H04R 5/033; H04R 25/507; H04R 2225/41; H04R 25/552;
(Continued)

(56) References Cited

U.S. PATENT DOCUMENTS

| 6,728,385 B2 * | 4/2004 | Kvaly | H04R 1/1016 381/328 |
| 7,512,245 B2 * | 3/2009 | Rasmussen | H04R 3/005 381/91 |

(Continued)

FOREIGN PATENT DOCUMENTS

| DE | 102011087984 | 6/2013 |
| EP | 1835785 | 9/2007 |

(Continued)

OTHER PUBLICATIONS

"International Search Report and Written Opinion mailed Aug. 19, 2021 in corresponding International Application No. PCT/IB2020061290 with International Filing Date of Nov. 30, 2020".

*Primary Examiner* — Xu Mei
(74) *Attorney, Agent, or Firm* — ALG Intellectual Property, LLC (57) ABSTRACT

An exemplary hearing device is configured to determine a first and a second sound pressure level (SPL) of a first and second spectral portion, respectively, of an ipsilateral audio signal representative of audio content. The first and second spectral portions have frequencies included in a first and a second frequency range, respectively, with the second frequency range being higher than the first frequency range. The device may further determine that the first SPL is greater than the second SPL by at least a threshold SPL amount and determine that a symmetry level between the ipsilateral and a contralateral audio signal is at least a threshold symmetry level. Based on these determinations, the hearing device may determine that the audio content comprises own voice content.

20 Claims, 10 Drawing Sheets

(51) Int. Cl.
  *G10L 25/21* (2013.01)
  *G10L 25/51* (2013.01)
  *H04R 5/033* (2006.01)

(52) U.S. Cl.
  CPC .......... *H04R 5/033* (2013.01); *H04R 25/507* (2013.01); *H04R 2225/41* (2013.01)

(58) Field of Classification Search
  CPC .............. H04R 25/554; H04R 2225/55; H04R 2430/03; G10L 17/26; G10L 25/21; G10L 25/51; G10L 17/00
  USPC ................................ 381/312–331, 23.1, 110
  See application file for complete search history.

(56) References Cited

U.S. PATENT DOCUMENTS

| | | | |
|---|---|---|---|
| 7,853,031 B2 | 12/2010 | Hamacher | |
| 8,873,779 B2 | 10/2014 | Lugger | |
| 9,094,766 B2 * | 7/2015 | Merks | G10L 25/78 |
| 10,142,745 B2 * | 11/2018 | Petersen | H04R 25/552 |
| 10,586,552 B2 * | 3/2020 | Li | G10L 25/84 |
| 11,244,699 B2 * | 2/2022 | Piechowiak | G10L 25/21 |
| 12,041,417 B2 * | 7/2024 | Ma | G01S 11/14 |
| 12,081,946 B2 * | 9/2024 | Brown | H04R 25/606 |
| 2008/0189107 A1 | 8/2008 | Laugesen | |
| 2013/0148829 A1 | 6/2013 | Lugger | |
| 2014/0314258 A1 | 10/2014 | Kamkar Parsi et al. | |
| 2017/0256272 A1 | 9/2017 | Kamkar Parsi et al. | |
| 2017/0318398 A1 | 11/2017 | Merks | |
| 2019/0020957 A1 | 1/2019 | Kamkar-Parsi et al. | |
| 2019/0075406 A1 | 3/2019 | Petersen | |
| 2020/0128335 A1 | 4/2020 | El Guindi | |
| 2020/0202889 A1 | 6/2020 | Piechowiak et al. | |

FOREIGN PATENT DOCUMENTS

| | | |
|---|---|---|
| EP | 2603018 | 2/2016 |
| EP | 3328097 | 5/2018 |
| EP | 3588981 | 1/2020 |
| EP | 3672281 | 6/2020 |

* cited by examiner

SYSTEMS AND METHODS FOR OWN VOICE DETECTION IN A HEARING SYSTEM

BACKGROUND INFORMATION

Hearing devices may be configured to provide a processed version of audio content to enhance the user's hearing. However, if the audio content includes the user's own speech (own voice content), amplifying and/or processing such content in a same manner as other detected audio content may produce an output that does not sound natural or beneficial to the user. Also, different processing strategies may be required or preferred for other audio content or own voice content. Thus, identifying own voice content in audio content is important for optimal performance of hearing devices.

US20080189107A1 describes a method of that attempts to identify own voice content using a ratio of signal energy between a direct sound part and a reverberant sound part.

U.S. Ser. No. 10/025,668B2 describes a hearing system with left and right hearing devices that each include a behind-the-ear microphone, an in-ear microphone, and an adaptive filter to attempt to detect a voice of the wearer of the hearing devices.

U.S. Ser. No. 10/616,694B2 describes a hearing device that analyzes sound with respect to a correspondence to an own voice sound type. Depending on how strongly the sound corresponds with the own voice, the sound is identified as own voice.

Each of these conventional approaches to detecting own voice content disadvantageously requires specialized components and/or complex processing.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Exemplary systems and methods for own voice detection in a hearing system are described herein. For example, a hearing system may include an ipsilateral microphone associated with (e.g., located near) an ipsilateral ear of a user and configured to detect an ipsilateral audio signal representative of audio content, a contralateral microphone associated with (e.g., located near) a contralateral ear of the user and configured to detect a contralateral audio signal representative of the audio content, and a hearing device associated with (e.g., configured to provide a processed version of the audio content to) the ipsilateral ear. The hearing device may be configured to determine a first sound pressure level (SPL) of a first spectral portion of the ipsilateral audio signal, determine a second SPL of a second spectral portion of the ipsilateral audio signal, determine that the first SPL is greater than the second SPL by at least a threshold SPL amount, and determine that a symmetry level between the ipsilateral audio signal and the contralateral audio signal is at least a threshold symmetry level. Based on the determination that the first SPL is greater than the second SPL by at least the threshold SPL amount and the determination that the symmetry level is at least the threshold symmetry level, the hearing device may be configured to determine that the audio content comprises own voice content representative of a voice of the user.

The systems and methods described herein may advantageously provide many benefits to users of hearing devices. For example, the hearing devices described herein may provide audio signals that more accurately replicate audio content that includes own voice content as perceived by normal hearing than conventional hearing systems. Moreover, the systems and methods described herein may more accurately detect own voice content without requiring additional components compared to conventional hearing systems. Additionally, the systems and methods described herein may more reliably and quickly detect own voice content while at the same time using lower computational power compared to conventional hearing systems. Further, the systems and methods described herein may, in some implementations, use a machine learning algorithm to dynamically adjust one or more of the thresholds described herein, thereby allowing the own voice detection capabilities of the systems and methods described herein to improve over time. For at least these reasons, the systems and methods described herein may advantageously provide additional functionality and/or features for hearing device users compared to conventional hearing systems. These and other benefits of the systems and methods described herein will be made apparent herein.

Figure 1:
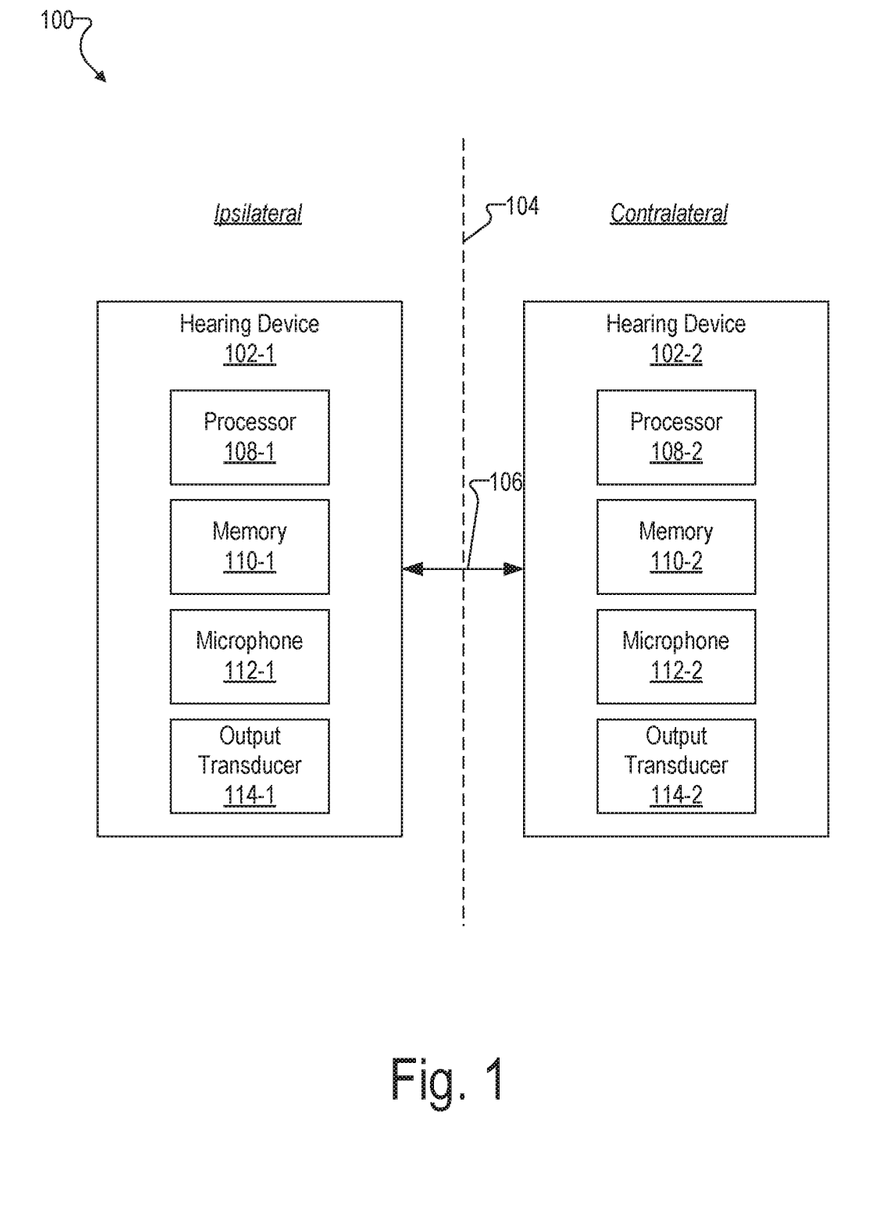
FIGS. 1-2 illustrate exemplary hearing systems according to principles described herein.

FIG. 1 illustrates an exemplary hearing system 100 that may be used to convey sound to a user, Hearing system 100 includes a first hearing device 102-1 and a second hearing device 102-2 (collectively "hearing devices 102"). As represented by the positioning in FIG. 1 of hearing devices 102 with respect to a dashed line 104, and from the perspective of hearing device 102-1, hearing device 102-1 is associated with an ipsilateral ear of the user and hearing device 102-2 is associated with a contralateral ear of the user. For example, if hearing device 102-1 is associated with the left ear of the user, hearing device 102-2 is associated with the right ear of the user. Alternatively, if hearing device 102-1 is associated with the right ear of the user, hearing device 102-2 is associated with the left ear of the user. As used herein, a hearing device is "associated with" a particular ear by being configured to be worn on or within the particular ear and/or by providing a hearing capability to the particular ear.

Hearing devices 102 may communicate one with another by way of a communication link 106, which may be wired or wireless as may serve a particular implementation.

Hearing devices 102 may each be implemented by any type of hearing device configured to provide or enhance hearing of a user of hearing system 100. For example, hearing devices 102 may each be implemented by a hearing aid configured to apply amplified audio content to a user, a sound processor included in a cochlear implant system configured to apply electrical stimulation representative of audio content to a user, a sound processor included in an electro-acoustic stimulation system configured to apply electro-acoustic stimulation to a user, a head-worn headset, an ear-worn ear-bud, a bearable, a smart headphone, or any other suitable hearing device. In some examples, hearing device 102-1 is of a different type than hearing device 102-2. For example, hearing device 102-1 may be a hearing aid and hearing device 102-2 may be a sound processor included in a cochlear implant system. As another example, hearing device 102-1 may be a unilateral hearing aid and hearing device 102-2 may be a contralateral routing of signals (CROS) hearing aid.

As shown, hearing device 102-1 may include a processor 108-1, a memory 110-1, a microphone 112-1, and an output transducer 114-1. Likewise, hearing device 102-2 may include a processor 108-2, a memory 110-2, a microphone 112-2, and an output transducer 114-2. Hearing devices 102 may include additional or alternative components as may serve a particular implementation.

Processors 108 (e.g., processor 108-1 and processor 108-2) are configured to perform various processing operations, such as processing audio content received by hearing devices 102 and transmitting data to each other. Processors 108 may each be implemented by any suitable combination of hardware and software. Any references herein to operations performed by a hearing device (e.g., hearing device 102-1 may be understood to be performed by the processor (e.g., processor 108-1) of the hearing device.

Memories 110 (e.g., memory 110-1 and memory 110-2) may be implemented by any suitable type of non-transitory computer readable storage medium and may maintain (e.g., store) data utilized by processors 108, For example, memories 110 may store data representative of an operation program that specifies how each processor 108 processes and delivers audio content to a user. To illustrate, if hearing device 102-1 is a hearing aid, memory 110-1 may maintain data representative of an operation program that specifies an audio amplification scheme (e.g., amplification levels, etc.) used by processor 108-1 to deliver acoustic content to the user. As another example, if hearing device 102-1 is a sound processor included in a cochlear implant system, memory 110-1 may maintain data representative of an operation program that specifies a stimulation scheme used by hearing device 102-1 to direct a cochlear implant to apply electrical stimulation representative of acoustic content to the user.

Microphones 112 (e.g., microphone 112-1 and microphone 112-2) may be implemented by any suitable audio detection device and are configured to detect audio signals presented to the user of hearing device 102. As illustrated in FIG. 1, microphones 112 may be included in (e.g., embedded within, on a surface of, or otherwise located on) hearing devices 102. One or both of microphones 112 may alternatively be separate from and communicatively coupled to their respective hearing devices 102. For example, microphone 112-1 may be removably attached to hearing device 102-1.

Microphone 112-1 may be referred to herein as an ipsilateral microphone associated with an ipsilateral ear of the user. Likewise, microphone 112-2 may be referred to herein as a contralateral microphone associated with a contralateral ear of the user. A microphone may be "associated with" a particular ear by being located relatively close to the particular ear so that the microphone detects audio signals presented to the particular ear. For example, microphone 112-1 may be configured to detect an audio signal presented to the ipsilateral ear (as such, this audio signal may be referred to herein as an "ipsilateral audio signal"). Likewise, microphone 112-2 may be configured to detect an audio signal presented to the contralateral ear (as such, this audio signal may be referred to herein as a "contralateral audio signal"). The ipsilateral and contralateral audio signals may be representative of the same audio content (e.g., music, speech, noise, own voice content, etc.), but may have different characteristics because of the different positioning of the microphones 112.

Output transducer 114 may be implemented by any suitable audio output device. For example, output transducer 114 may be implemented by a loudspeaker (also referred to as a receiver) of a hearing device or one or more electrodes of a cochlear implant system.

Figure 2:
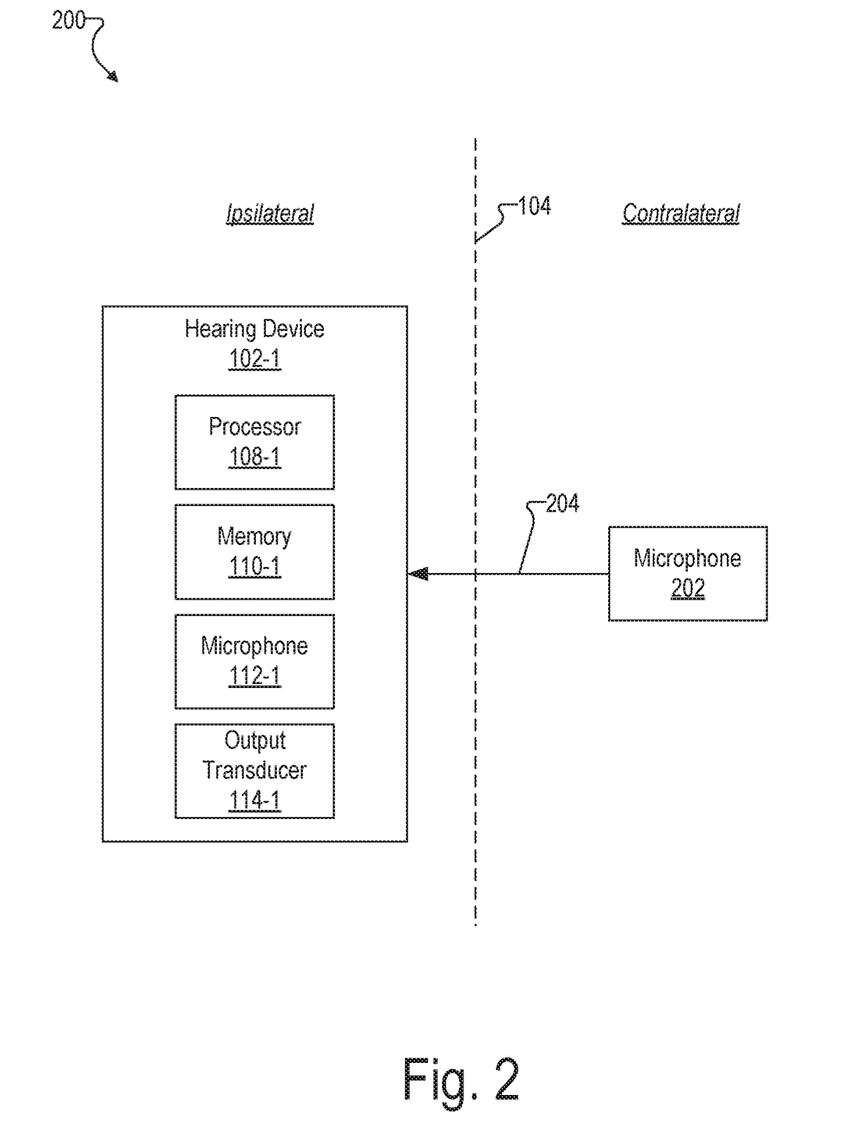

FIG. 2 illustrates an alternative hearing system 200 that may be used in accordance with the systems and methods described herein. Hearing system 200 is similar to hearing system 100 in that hearing system 200 includes hearing device 102-1 associated with an ipsilateral ear of a user. However, as shown, hearing system 200 does not include a second hearing device associated with the contralateral ear of the user. Rather, hearing system 200 includes a contralateral microphone 202 associated with the contralateral ear of the user and communicatively coupled to hearing device 102-1 by way of a communication link 204, which may be wired or wireless as may serve a particular implementation.

As described herein, a hearing device (e.g., hearing device 102-1 and/or hearing device 102-2) may be configured to determine when audio content represented by ipsilateral and contralateral audio signals detected by ipsilateral and contralateral microphones, respectively, includes own voice content. As will now be described, this may be performed at least in part based on a comparison of SPLs of different spectral portions of the ipsilateral audio signal.

Figure 3:
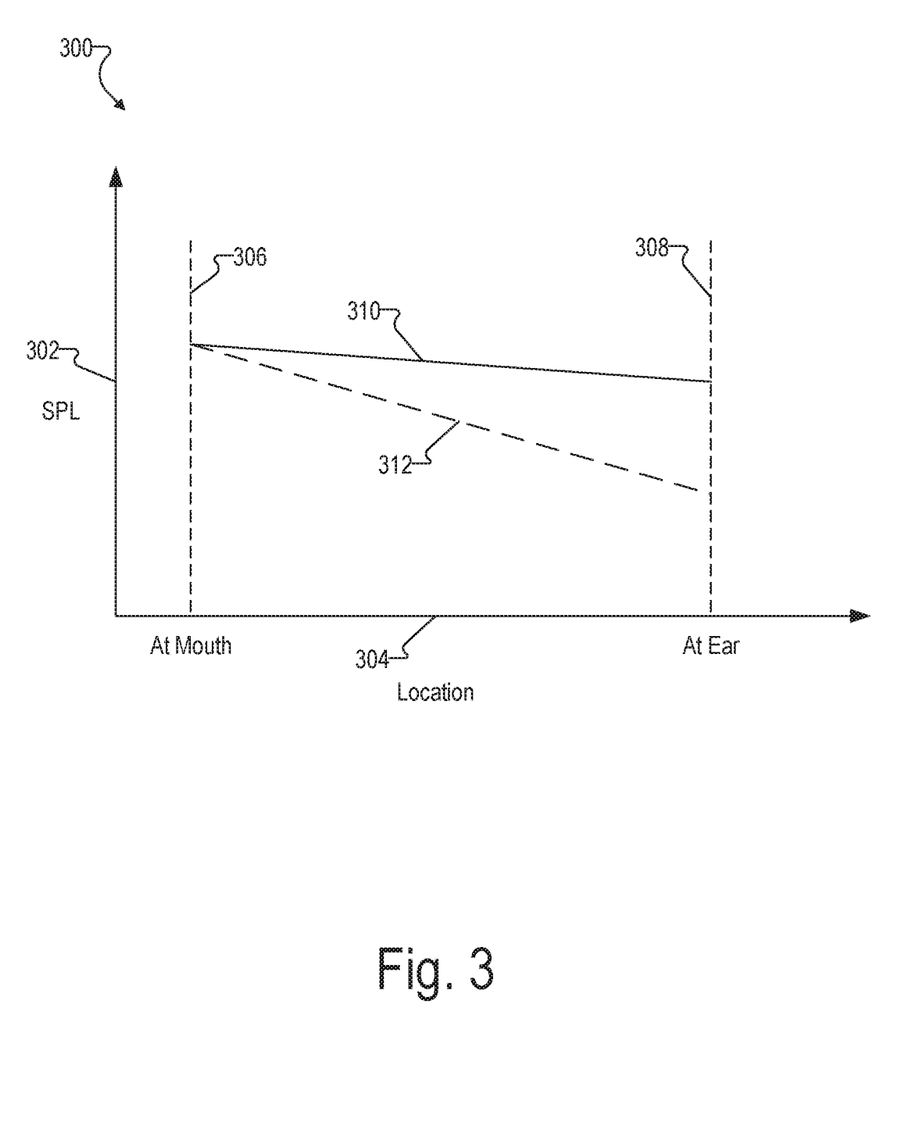
FIGS. 3-4 illustrate exemplary graphs for own voice detection according to principles described herein.

FIG. 3 illustrates an exemplary graph 300 that shows SPLs for an audio signal that includes own voice content. Graph 300 includes a y-axis 302 that represents a relative SPL against an x-axis 304 that represents a relative distance. For instance, x-axis 304 shows two locations, a location 306 representing a location at a mouth of a user and a location 308 representing a location at an ear of the user. Solid line 310 depicts an SPL of a first spectral portion of an audio signal and dashed line 312 depicts an SPL of a second spectral portion of the audio signal. The first spectral portion corresponds to frequencies including a low frequency range of the audio signal, while the second spectral portion corresponds to frequencies including a high frequency range of the audio signal.

The range of frequencies for the first spectral portion may be any suitable frequency range that is lower than a remaining frequency range of the audio signal. For example, a low frequency range may be a frequency band of any suitable width (e.g., 10 hertz (Hz) to 2 kHz) centered at any suitable relatively low audio frequency (e.g., 500 Hz to 2 kHz) For instance, the low frequency range may be 800 Hz to 1200 Hz, 975 Hz to 1025 Hz, or any other suitable range. An SPL of a spectral portion may be any suitable SPL associated with the spectral portion, such as an average SPL, a median SPL, a maximum SPL, a minimum SPL, etc. The range of frequencies for the second spectral portion may be any suitable frequency range that is higher than the low frequency range of the audio signal. For example, a high frequency range may be a frequency band of any suitable width (e.g., 10 hertz (Hz) to 2 kHz) centered at any suitable relatively high audio frequency (e.g., 4 kHz to 10 kHz). For instance, the high frequency range may be 4 kHz to 7 kHz, 5 kHz to 6 kHz, or any other suitable range.

When the audio content includes own voice content, the audio signal may leave the mouth of the user with a relatively similar SPL for the low frequency range and the high frequency range, as shown at location 306. However, the low frequency range and the high frequency range may take different acoustic paths to reach the ear. The low frequency range of the audio signal (or at least a portion of the low frequency range of the audio signal) may be transmitted from the mouth to the ear via direct conduction through the head of the user. The high frequency range of the audio signal, however, may not be able to conduct through the head and may instead be transmitted through a non-direct path between the mouth and the ear (including via reflection off of other surfaces). As a result, the SPL of the low frequency range may attenuate less than the SPL of the high frequency range as the audio signal travels from the mouth to the ear, as shown at location 308.

Figure 4:
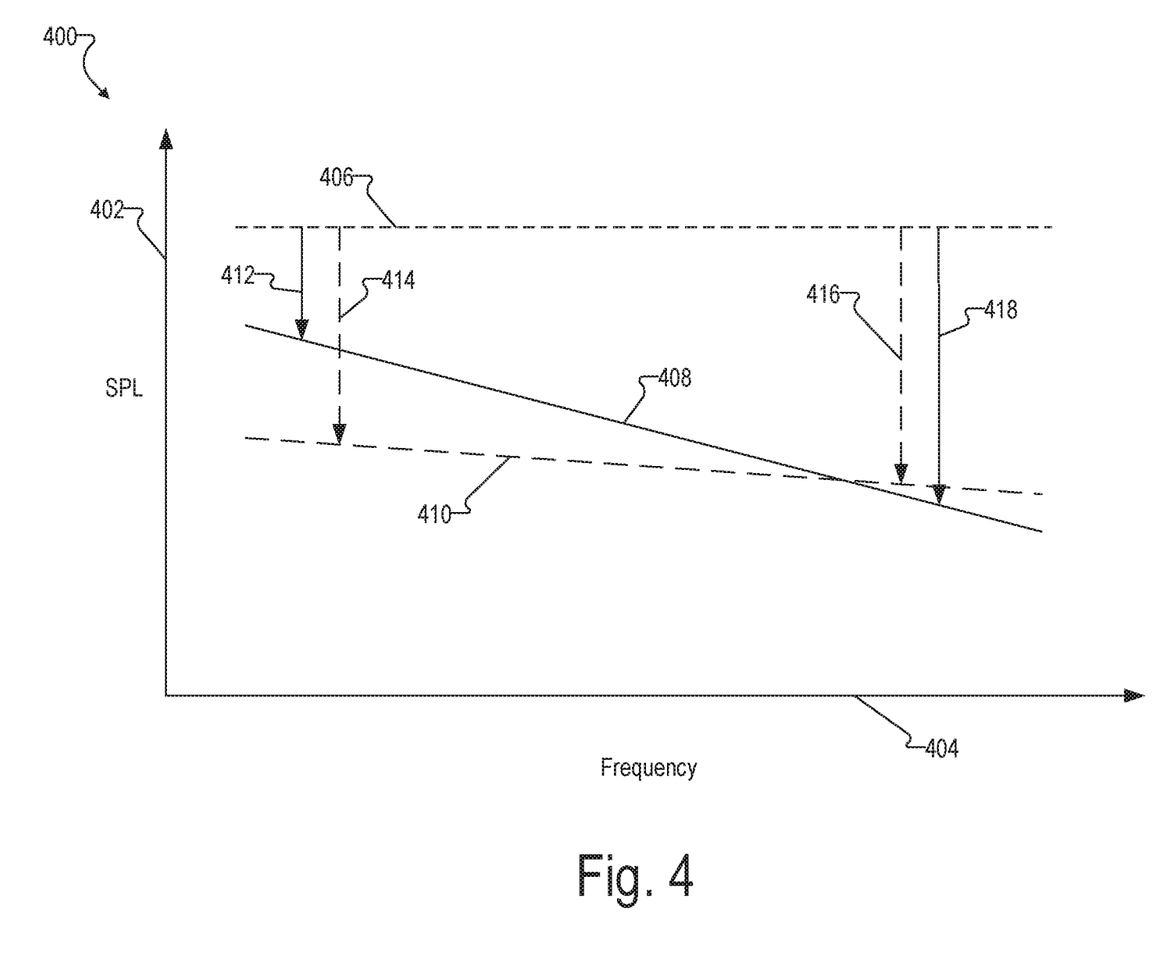

FIG. 4 illustrates an exemplary graph 400 that further shows SPL for an audio signal that represents audio content including own voice content. Graph 400 includes a y-axis 402 that represents SPL against an x-axis 404 that represents frequency. Dashed line 406 represents an audio signal at a source of the audio signal. In this example, the audio signal may have a same SPL across the spectrum of the audio signal at the source of the audio signal and therefore dotted line 406 has a same SPL value across all values of frequency.

Solid line 408 represents a transmission of the audio signal to an ear of a user if the audio signal represents own voice content. As described with respect to graph 300, a low frequency range of the audio signal attenuates less than a high frequency range of the audio signal when the audio signal represents own voice content. In contrast, dashed line 410 represents a transmission of the audio signal to the ear of the user (over a same distance) if the audio signal represents audio content that does not include the own voice content. As shown, the low frequency range of the audio signal attenuates a relatively similar amount as the high frequency range when the audio content does not include own voice content, as both frequency ranges travel a similar acoustic path from a source of the audio content to the ear of the user.

The contrast in audio signals with and without own voice content is highlighted by arrows 412 and 414, which show at the low frequency range the greater drop in SPL for the audio signal without the own voice content (arrow 414) compared to the audio signal with the own voice content (arrow 412). Arrows 416 and 418, meanwhile, show less of a difference in drop in SPL at the high frequency range for the audio signal without the own voice content (arrow 416) and the audio signal with the own voice content (arrow 418). Rather, as shown in this example, at a certain frequency level, the audio signal with the own voice content may attenuate more than the audio signal without the own voice content. These differences between SPL for spectral portions of audio signals detected at (e.g., near) the ear of the user may be a factor that a hearing device (e.g., hearing device 102-1) may consider when determining whether the audio signals represent audio content that ncludes own voice content.

Figure 5:
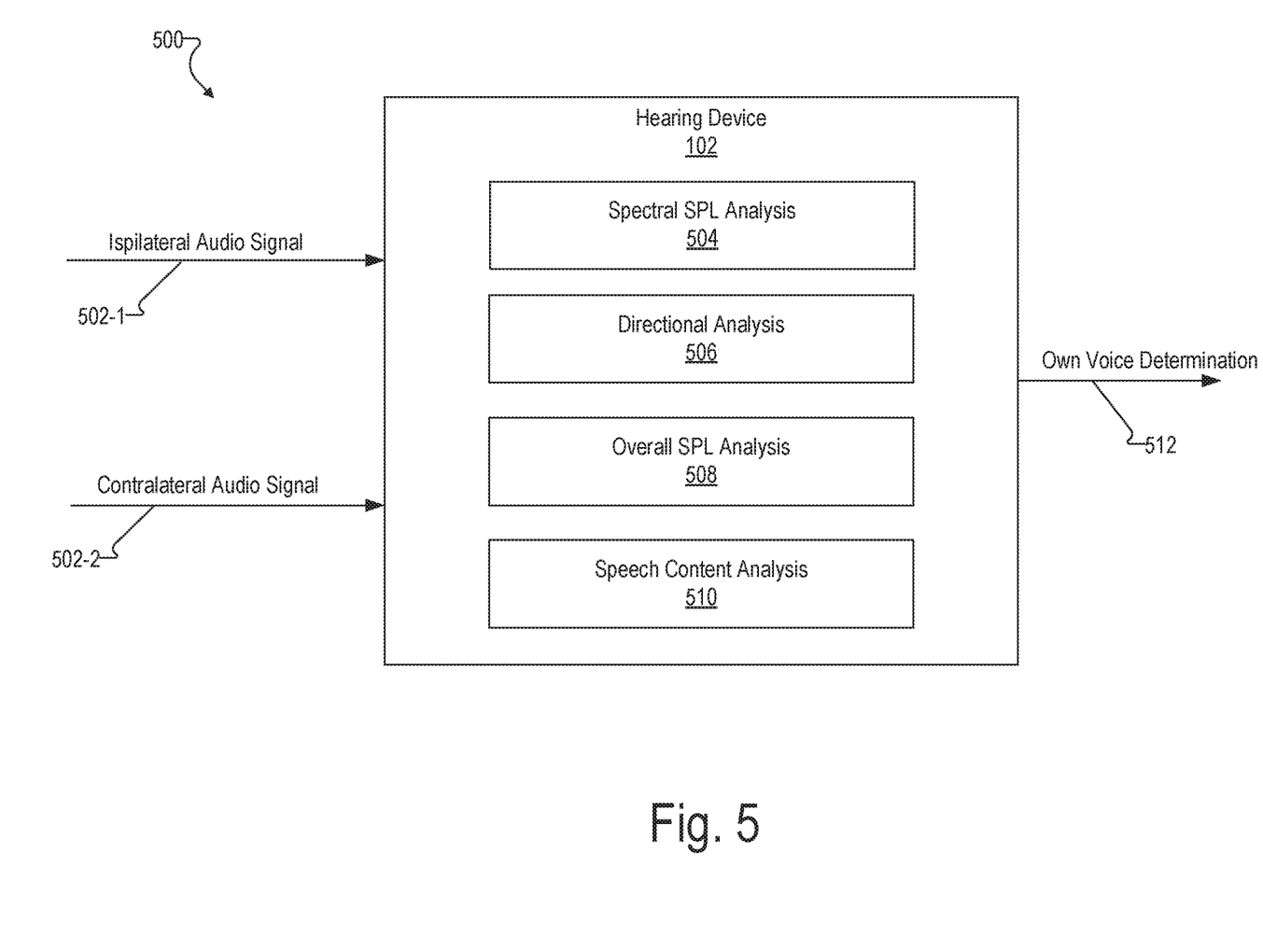
FIGS. 5-6 illustrate exemplary hearing devices according to principles described herein.

FIG. 5 illustrates an exemplary configuration 500 of a hearing device 102, which may represent either hearing device 102-1 or 102-2 described herein. As shown, hearing device 102 receives an ipsilateral audio signal 502-1 and a contralateral audio signal 502-2 (collectively audio signals 502). As described, ipsilateral audio signal 502-1 may be detected by an ipsilateral microphone (e.g., microphone 112-1) and contralateral audio signal 502-2 may be detected by a contralateral microphone (e.g., microphone 112-2 or microphone 202).

Hearing device 102 may perform various operations with respect to audio signals 502 to determine whether audio signals 502 include own voice content, as represented by analysis functions 504-510. For example, as shown, hearing device 102 may perform a spectral SPL analysis 504, a directional analysis 506, an overall SPL analysis 508, and/or a speech content analysis 510 with respect to ipsilateral audio signal 502-1 and/or contralateral audio signal 502-2 to determine whether these audio signals include own voice content. Hearing device 102 may use any combination of one or more of these analysis functions 504-510 as may serve a particular implementation. For example, in some cases, hearing device 102 may determine that ipsilateral audio signal 502-1 and/or contralateral audio signal 502-2 include own voice content based on spectral SPL analysis 504 and directional analysis 506 alone or in combination with overall SPL analysis 508 and/or speech content analysis 510. Based on the processing of ipsilateral audio signal 502-1 and/or contralateral audio signal 502-2 with one or more of analysis functions 504-510, hearing device 102 may output own voice determination data 512 that indicates whether audio signals 502 include own voice content. Each of analysis functions 504-510 are described herein.

Hearing device 102 may perform spectral SPL analysis 504 in any suitable manner. For example, hearing device 102 may determine a first SPL of a first spectral portion of the ipsilateral audio signal. The first spectral portion may have frequencies included in a first frequency range. Hearing device 102 may further determine a second SPL of a second spectral portion of the ipsilateral audio signal. The second spectral portion may have frequencies included in a second frequency range that is higher than the first frequency range. Hearing device 102 may further determine whether the first SPL is greater than the second SPL by at least a threshold SPL amount. The threshold amount may be any suitable threshold SPL amount. For instance, an average first SPL for the ipsilateral audio signal for audio content that does not include own voice content may be approximately 10 decibels (dB) higher than the second SPL. In contrast, an average first SPL for the ipsilateral audio signal for audio content that includes own voice content may be approximately 30 dB higher than the second SPL. Thus, the threshold SPL amount may be set for a value in between the average difference values (e.g., 15 dB, 20 dB, 25 dB, etc.).

Additionally or alternatively, hearing device 102 may determine whether the first SPL is greater than the second SPL by at least the threshold amount by determining a ratio between the first SPL and the second SPL and determining whether the ratio is higher than a threshold ratio associated with the threshold SPL amount. The threshold SPL ratio may be any suitable SPL ratio that indicates less attenuation of the first spectral portion than the second spectral portion by the threshold SPL amount, Thus, the threshold SPL ratio may indicate that the SPL of the first spectral portion is greater than the SPL of the second spectral portion by at least the threshold SPL amount. For example, the threshold ratio may be between 25 and 35 (e.g., between 28 and 32, set to 30 or any other threshold between 25 and 35, etc.) or any other suitable ratio.

Hearing device 102 may perform directional analysis 506 in any suitable manner. For example, hearing device 102 (e.g., a directional/spatial classifier of hearing device 102) may determine a symmetry level between ipsilateral audio signal 502-1 and contralateral audio signal 502-2 and compare the symmetry level to a threshold symmetry level. Hearing device 102 may further use a head-related transfer function to determine a direction from which audio signals 502 are coming relative to the user. As the mouth is anterior to the ears of the user, audio signals generated by the mouth may appear to be coming from in front of the user (and/or may reflect off of objects to actually come from in front of the user).

Audio signals from the front of the user may be relatively symmetrical as detected by a left ear and a right ear. Thus, hearing device 102 may determine a symmetry level between ipsilateral audio signal 502-1 and contralateral audio signal 502-2. The symmetry level may be determined in any suitable manner, such as comparing SPLs of audio signals 502, waveform shapes of audio signals 502, etc. Hearing device 102 may determine whether the symmetry level is at least the threshold symmetry level. The threshold symmetry level may be any suitable threshold symmetry level. Additionally, hearing device 102 may further determine whether relatively symmetrical audio signals appear to be coming from in front of the user or behind the user, as audio signals from behind the user may also be relatively symmetrical. Such a determination may be performed in any suitable manner, such as using a head-related transfer function.

Hearing device 102 may perform overall SPL analysis 508 in any suitable manner. For instance, hearing device 102 may determine an SPL (e.g., across most or all frequencies) of ipsilateral audio signal 502. The SPL for audio signals with own voice content are generally higher overall than the SPL for audio signals without own voice content, as the source of own voice content is the mouth of the user and thus a fixed distance from the ears of the user. Audio signals without own voice content, on the other hand, are generally from a source that is further from the ear of the user than the mouth of the user, and consequently are generally lower in overall SPL. Hearing device 102 may compare the overall SPL to a threshold SPL to determine whether the audio content may include own voice content. The threshold SPL may be any suitable SPL.

Hearing device 102 may perform speech content analysis 510 in any suitable manner. Own voice content may generally include speech content, and therefore a detection of speech content may be another factor used in determining whether the audio content includes own voice content. Further, the generally higher overall SPL may especially be true of audio signals representing audio content that includes speech content.

Hearing device 102 may provide an output 512 of an own voice determination based on one or more of these analyses. In some examples, machine learning algorithms may be used to optimize detection of own voice content based on these and other factors. In some examples, own voice determination may be further based on an own voice determination of a contralateral hearing device. Based on the analysis functions 504-510, both an ipsilateral hearing device and a contralateral hearing device should come to a same determination of whether audio signals include own voice content. Thus, each device may further base its respective own voice determination on the own voice determination of the other hearing device.

Figure 6:
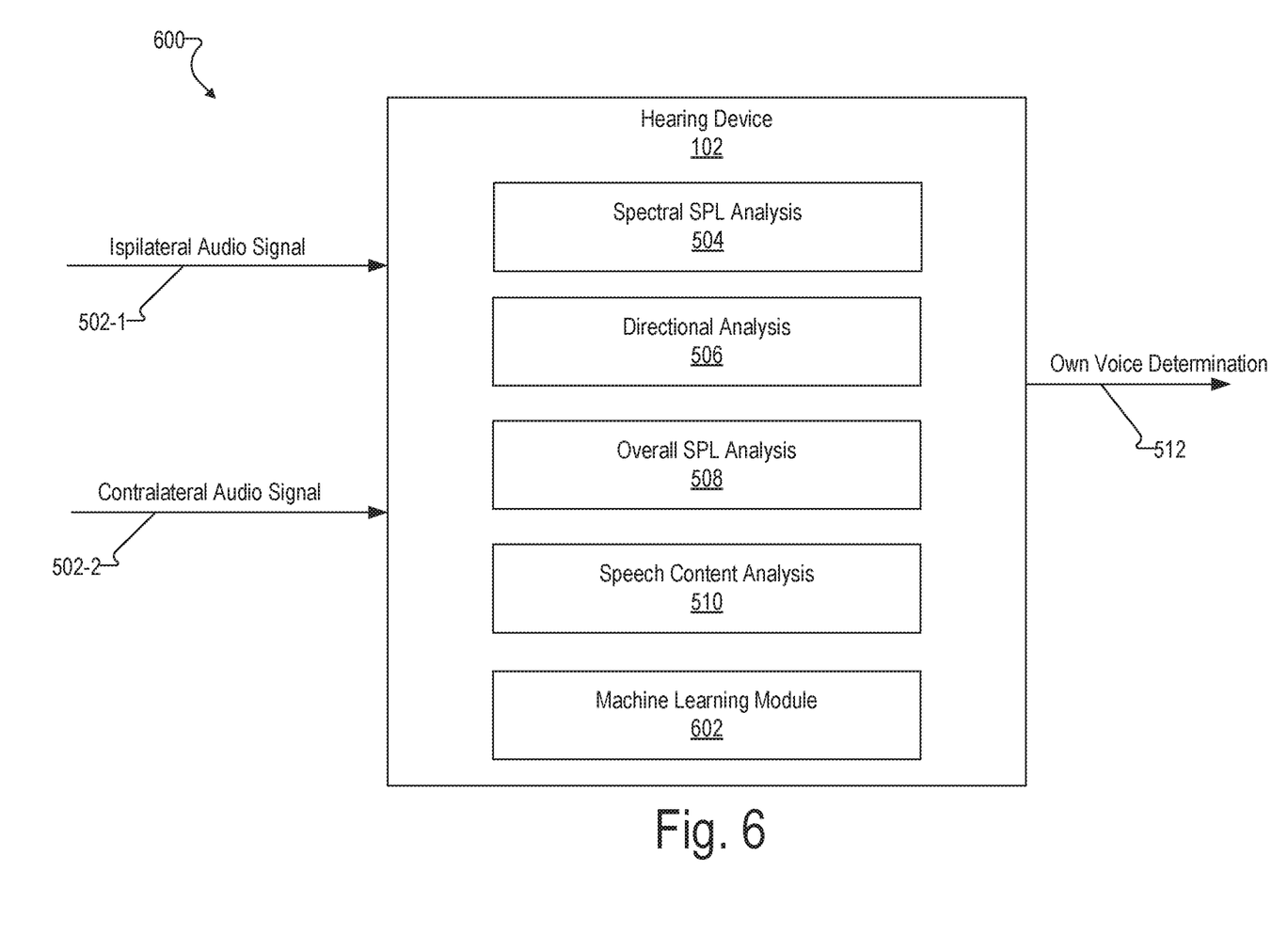

FIG. 6 illustrates an exemplary configuration 600 of hearing device 102 including a machine learning module 602 configured to implement such machine learning algorithms. Configuration 600 shows hearing device 102 as in configuration 500, with the addition of machine learning module 602. Machine learning module 602 may be implemented using any suitable machine learning algorithm, such as a neural network (e.g., an artificial neural network (ANN), a convolutional neural network (CNN), a deep neural network (DNN), and/or a recurrent neural network (RNN), etc.), reinforcement learning, linear regression, etc, Machine learning module 602 may determine optimal parameters, weights, etc. for the various characteristics of audio signals 502 analyzed by hearing device 102, For example, machine learning module 602 may determine optimal thresholds for spectral SPL analysis 504, optimal frequency ranges for spectral SPL analysis 504, thresholds for symmetry levels for directional analysis 506, thresholds for overall SPL analysis 508, etc. Machine learning module 602 may be trained in any suitable manner. For instance, machine learning module 602 may be configured to update thresholds based on determinations of whether audio signals 502 include own voice content. Such optimizations are described herein. Additionally or alternatively, machine learning module 602 may be trained in a supervised manner, such as using an initial data set of audio signals that are labeled according to whether the audio signals include own voice content and/or receiving input from a user when audio signals include (or do not include) own voice content, etc.

While configuration 600 shows machine learning module 602 included in hearing device 102, alternatively machine learning module may be remotely implemented and communicatively coupled to hearing device 102 (e.g., on a smartphone, a server, etc.). Additionally or alternatively, any of analysis functions 504-510 may also be performed on a remote device communicatively coupled to hearing device 102.

Figure 7:
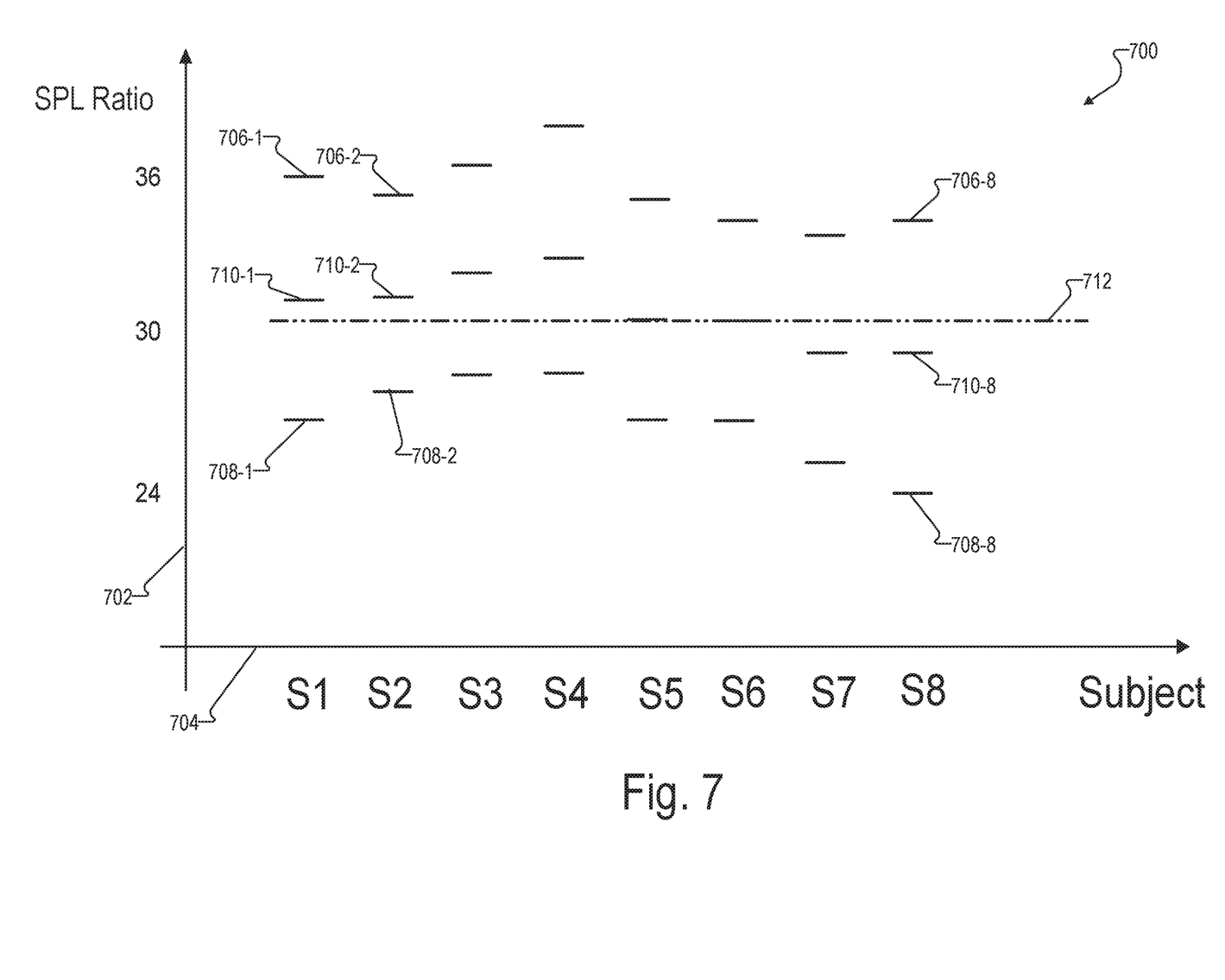
FIG. 7 illustrates an exemplary graph for own voice detection according to principles described herein.

FIG. 7 illustrates an exemplary graph 700 that shows SPL ratios for audio signals that represent audio content with and without own voice content. Graph 700 includes a y-axis 702 that represents SPL ratio against an x-axis 704 that represents eight subjects for whom sample SPL ratios were determined. For each subject, S1-S8, SPLs were measured for frequency ranges for audio signals with own voice content and without own voice content and SPL ratios determined based on the SPLs.

Solid lines 706 show SPL ratios for audio signals with own voice content for subjects S1-S8, and dashed lines 708 show SPL ratios for audio signals without own voice content for subjects S1-S8, For example, solid line 706-1 shows an SPL ratio of about 36 between an SPL for a high frequency range and an SPL for a low frequency range for audio signals with own voice content for subject S1. Dashed line 708-1 shows an SPL ratio of about 27 between an SPL for the high frequency range and an SPL for the low frequency range for audio signals without own voice content for subject S1.

In between solid lines 706 and dashed lines 708 are dashed lines 710 that may be example thresholds between the SPL ratios for audio signals with own voice content and audio signals without own voice content. For instance, dashed line 710-1 shows an SPL ratio of about 31 that may be used as a threshold SPL ratio for subject S1. Additionally or alternatively, dashed line 712 shows an average threshold SPL ratio (e.g., an SPL ratio around 30) determined based on the threshold SPL ratios for subjects S1-S8. The average threshold SPL ratio may be used as a default threshold SPL ratio (e.g., an SPL ratio between 28-32), which may then be adjusted based on individual SPL ratios as described herein.

Figure 8:
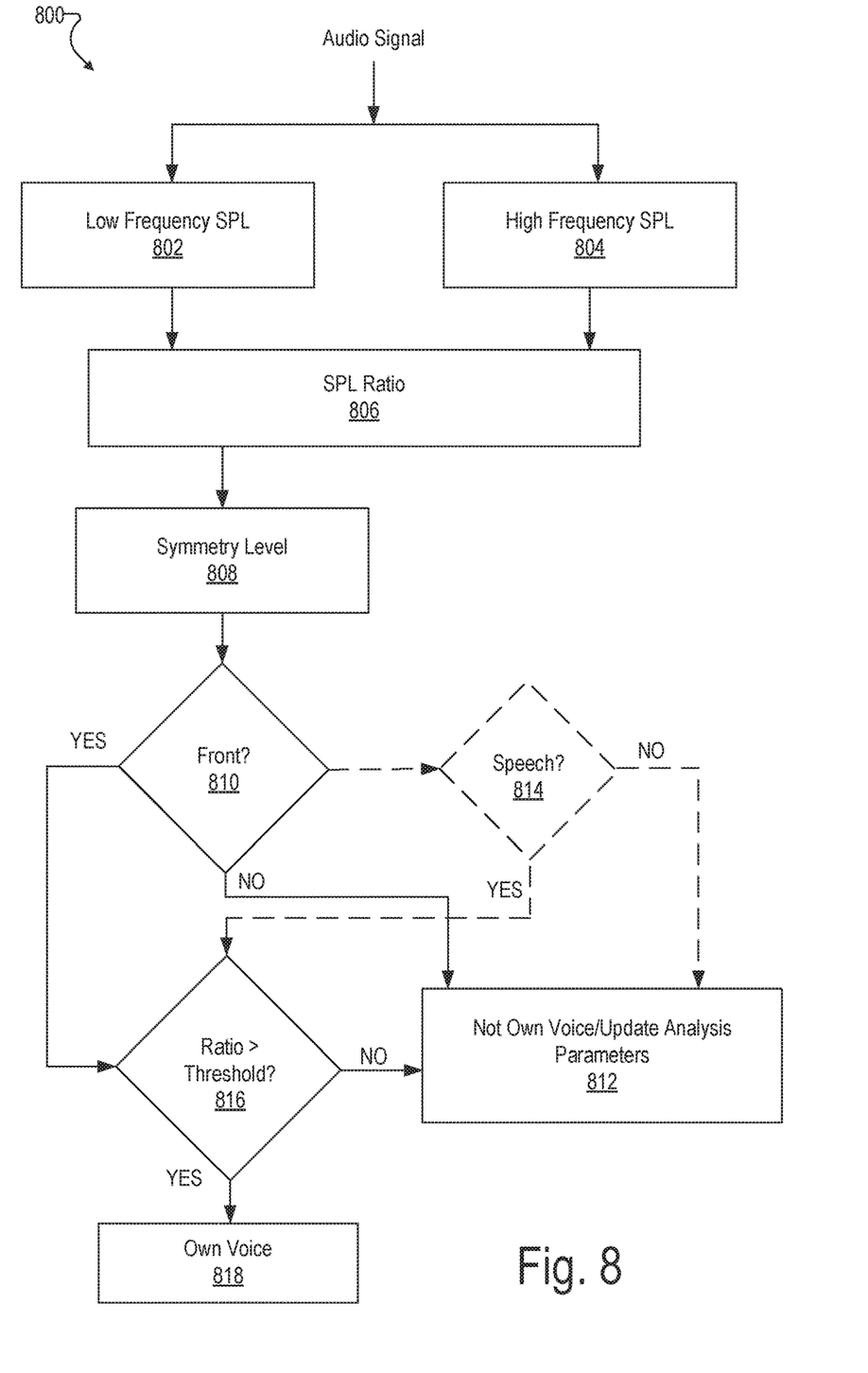
FIG. 8 illustrates an exemplary flow chart for own voice detection according to principles described herein.

FIG. 8 illustrates an exemplary flow chart 800 for determining own voice content by a hearing device (e.g., hearing device 102). Hearing device 102 may receive an ipsilateral and a contralateral audio signal and at operation 802, determine an SPL for a first spectral portion including a low frequency range of the ipsilateral audio signal. The SPL may be determined in any suitable manner. At operation 804, hearing device 102 may determine an SPL for a second spectral portion including a high frequency range of the ipsilateral audio signal.

At operation 806, hearing device 102 may determine an SPL ratio between the SPL of the low frequency range and the SPL of the high frequency range. The SPL ratio may be determined in any of the ways described herein. For example, the SPL of the low frequency range may be divided by the SPL of the high frequency range. Additionally or alternatively, in the frequency domain, the SPL of the high frequency range may be subtracted from the SPL of the low frequency range. Additionally or alternatively, a slope may be determined based on the SPL difference and the difference in frequency ranges.

At operation 808, hearing device 102 may determine a symmetry level between the ipsilateral and contralateral audio signals. The symmetry level may be determined in any of the ways described herein.

At operation 810, hearing device 102 may determine, based on the symmetry level, whether the audio signal appears to be coming from in front of the user. In some examples, this determination may be further based on a head-related transfer function, as described herein. If hearing device 102 determines that the audio signal does not appear to be coming from in front of the user (No, operation 810), hearing device 102 may determine that the audio content represented by the audio signal does not include the own voice content at operation 812.

In some examples, hearing device 102 may also update analysis parameters at operation 812. For example, hearing device 102 may use characteristics of the audio signals to determine and/or adjust threshold values against which to compare additional audio signals for determining own voice content. For instance, characteristics of the audio signals may include overall SPL, the SPL ratio, SPLs for different spectral portions of the audio signal (e.g., to adjust frequency ranges for the spectral portions); etc. Based on such characteristics, hearing device 102 may adjust the threshold SPL amount, the overall SPL threshold, frequency ranges for the first and second spectral portions, the threshold symmetry level, and/or any other thresholds for detecting own voice content. As described in connection with FIG. 7, in some examples, machine learning module 702 may be used to perform these adjustments. Additionally or alternatively, any other suitable process may be used to perform the adjustments.

In some examples, hearing device 102 may also determine at operation 814 whether the audio content includes speech content. Hearing device 102 may analyze the audio signal to detect speech content in any suitable manner. If hearing device 102 determines that the audio content does not include speech content (No, operation 814), hearing device 102 may perform operation 812, determining that the audio signal does not represent own voice content and updating analysis parameters accordingly, based on the characteristics of the audio signal. If hearing device 102 determines that the audio content does include speech content (Yes, operation 814), hearing device 102 may perform operation 816.

If at operation 810 hearing device 102 determines that the audio signal does appear to be coming from in front of the user (Yes, operation 810), hearing device 102 may; at operation 816, determine whether the SPL ratio determined at operation 806 is at least a threshold SPL ratio. If hearing device 102 determines that the SPL ratio is less than the threshold SPL ratio (No, operation 816), hearing device 102 may perform operation 812, determining that the audio signal does not represent own voice content and updating analysis parameters accordingly, based on the characteristics of the audio signal. Thus, hearing device 102 may determine that the ipsilateral audio signal does not include own voice content despite the ipsilateral and contralateral audio signals having at least a threshold symmetry level; based on the SPL ratio of the ipsilateral audio signal not meeting the threshold SPL ratio. Conversely, hearing device 102 may determine that the ipsilateral audio signal does not include own voice content despite having at least a threshold SPL ratio, based on the ipsilateral and contralateral audio signals not meeting the threshold symmetry level.

If hearing device 102 determines that the SPL ratio is at least the threshold SPL ratio (Yes, operation 816), then hearing device 102 may determine that the audio signal is representative of own voice content at operation 818. Thus, determining that the audio signal is representative of own voice content is based on both determining that the SPL ratio is at least the SPL ratio (Yes, operation 816) and determining that the audio signal appears to be coming from in front of the user (Yes, operation 810).

Hearing device 102 may use this determination of own voice content in any suitable manner. For instance, audio signals that include own voice content may be processed differently than audio signals that do not include own voice content. Such processing may be configured to provide the user's own voice to the user in a manner that sounds more natural to the user, to improve keyword detection, occlusion control, etc. For example, hearing device 102 may include various sound processing programs, some of which may be configured for processing own voice content. Such programs may be selected and/or adjusted based on the determination that the audio signal includes own voice content, Additionally or alternatively, the own voice content may be used in any suitable manner, such as providing to a phone for transmission, for mixing of sidetones for a phone, etc.

Figure 9:
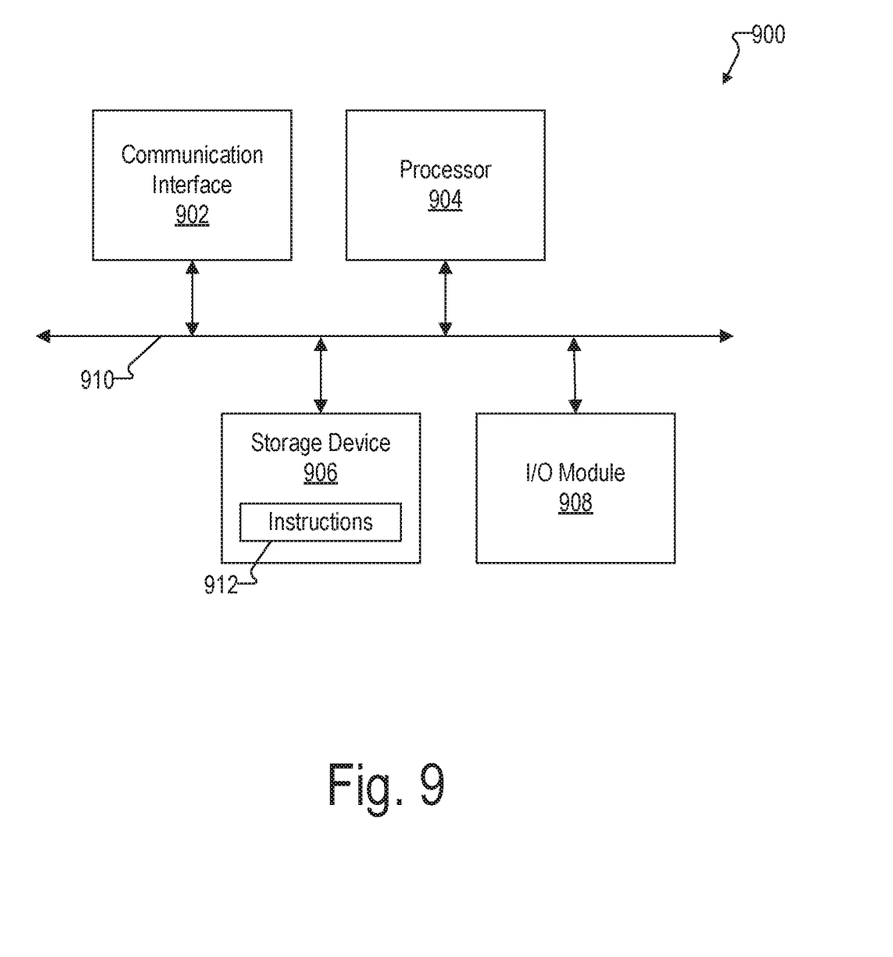
FIG. 9 illustrates an exemplary computing device according to principles described herein.

Further, hearing device 102 may also update analysis parameters based on determining that the audio signal represents own voice content, using characteristics of the audio signal. For instance, while attenuation of the low frequency range compared to the high frequency range may generally follow a recognizable pattern, the pattern may vary based on each particular user. Further, even for each particular user, characteristics (and consequently, optimal thresholds) may vary based on content of the speech, as well as emotion, volume, health, activity, acoustic environment, etc. of the user. Therefore, hearing device 102 may further update analysis parameters based on determining that the audio signal represents own voice content. Any suitable machine learning algorithms may likewise be used. In some examples, analysis parameter values for hearing device 102 may initially be programmed and/or trained using machine algorithms based on profiles, characteristics, models, and/or voice samples of the particular user, FIG. 9 illustrates an exemplary computing device 900 that may be specifically configured to perform one or more of the processes described herein. Any of the systems, units, computing devices, and/or other components described herein may be implemented by computing device 900.

As shown in FIG. 9, computing device 900 may include a communication interface 902, a processor 904, a storage device 906, and an input/output ("I/O") module 908 communicatively connected one to another via a communication infrastructure 910. While an exemplary computing device 900 is shown in FIG. 9, the components illustrated in FIG. 9 are not intended to be limiting. Additional or alternative components may be used in other embodiments. Components of computing device 900 shown in FIG. 9 will now be described in additional detail.

Communication interface 902 may be configured to communicate with one or more computing devices. Examples of communication interface 902 include, without limitation, a wired network interface (such as a network interface card), a wireless network interface (such as a wireless network interface card), a modem, an audio/video connection, and any other suitable interface.

Processor 904 generally represents any type or form of processing unit capable of processing data and/or interpreting, executing, and/or directing execution of one or more of the instructions, processes, and/or operations described herein. Processor 904 may perform operations by executing computer-executable instructions 912 (e.g., an application, software, code, and/or other executable data instance) stored in storage device 906.

Storage device 906 may include one or more non-transitory computer readable data storage media, devices, or configurations and may employ any type, form, and combination of data storage media and/or device. For example, storage device 906 may include, but is not limited to, any combination of the non-volatile media and/or volatile media described herein. Electronic data, including data described herein, may be temporarily and/or permanently stored in storage device 906. For example, data representative of computer-executable instructions 912 configured to direct processor 904 to perform any of the operations described herein may be stored within storage device 906. In some examples, data may be arranged in one or more databases residing within storage device 906.

I/O module 908 may include one or more I/O modules configured to receive user input and provide user output. I/O module 908 may include any hardware, firmware, software, or combination thereof supportive of input and output capabilities. For example, I/O module 908 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 908 is configured to provide graphical data to a display for presentation to a user. The graphical data may be representative of one or more graphical user interfaces and/or any other graphical content as may serve a particular implementation.

Figure 10:
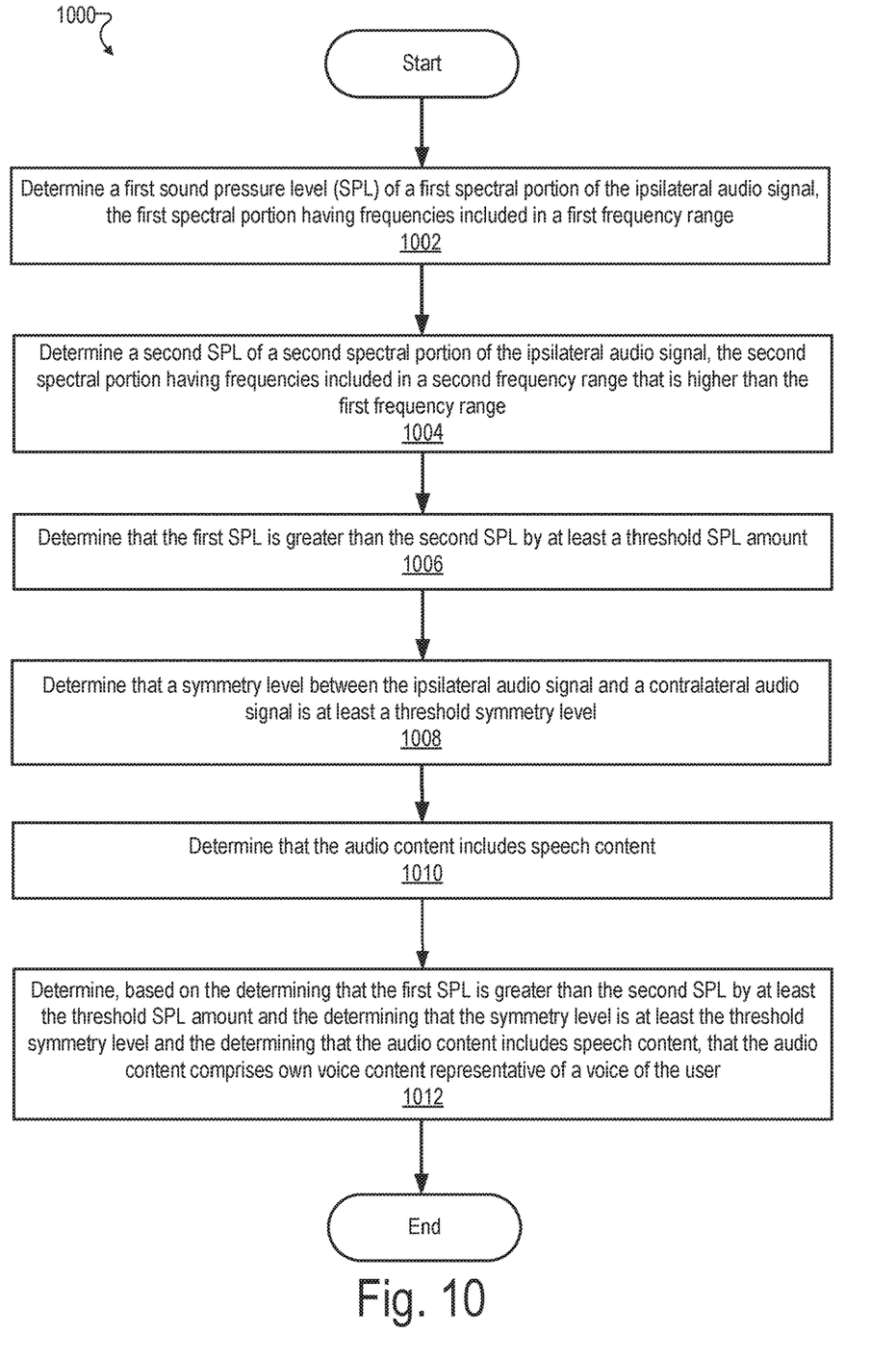
FIG. 10 illustrates an exemplary method according to principles described herein.

FIG. 10 illustrates an exemplary method 1000. One or more of the operations shown in FIG. 10 may be performed by any of the hearing devices described herein. While FIG. 10 illustrates exemplary operations according to one embodiment, other embodiments may omit, add to, reorder, and/or modify any of the operations shown in FIG. 10. Each of the operations shown in FIG. 10 may be performed in any of the ways described herein.

At operation 1002, a hearing device associated with an ipsilateral ear determines a first sound pressure level (SPL) of a first spectral portion of the ipsilateral audio signal, the first spectral portion having frequencies included in a first frequency range.

At operation 1004, the hearing device determines a second SPL of a second spectral portion of the ipsilateral audio signal, the second spectral portion having frequencies included in a second frequency range that is higher than the first frequency range.

At operation 1006, the hearing device determines that the first SPL is greater than the second SPL by at least a threshold SPL amount.

At operation 1008, the hearing device determines that a symmetry level between the ipsilateral audio signal and a contralateral audio signal is at least a threshold symmetry level.

At operation 1010, the hearing device determines that the audio content includes speech content.

At operation 1012, the hearing device determines, based on the determining that the first SPL is greater than the second SPL by at least the threshold SPL amount and the determining that the symmetry level is at least the threshold symmetry level and the determining that the audio content includes speech content, that the audio content comprises own voice content representative of a voice of the user.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A hearing system comprising:
an ipsilateral microphone associated with an ipsilateral ear of a user and configured to detect an ipsilateral audio signal representative of audio content;
a contralateral microphone associated with a contralateral ear of the user and configured to detect a contralateral audio signal representative of the audio content; and
a hearing device associated with the ipsilateral ear and configured to:
determine a first sound pressure level (SPL) of a first spectral portion of the ipsilateral audio signal, the first spectral portion having frequencies included in a first frequency range;
determine a second SPL of a second spectral portion of the ipsilateral audio signal, the second spectral portion having frequencies included in a second frequency range that is higher than the first frequency range;
determine that the first SPL is greater than the second SPL by at least a threshold SPL amount;
determine that a symmetry level between the ipsilateral audio signal and the contralateral audio signal is at least a threshold symmetry level; and
determine, based on the determining that the first SPL is greater than the second SPL by at least the threshold SPL amount and the determining that the symmetry level is at least the threshold symmetry level, that the audio content comprises own voice content representative of a voice of the user.

2. The hearing system of claim 1, wherein the determining that the first SPL is greater than the second SPL by at least the threshold SPL amount comprises:
determining a ratio between the first SPL and the second SPL; and determining that the ratio is higher than a threshold ratio associated with the threshold SPL amount.

3. The hearing system of claim 2, wherein the first frequency range is between 800 hertz (Hz) and 1200 Hz, the second frequency range is between 4 kilohertz (kHZ) and 7 kHz, and the threshold ratio is between 25 and 35.

4. The hearing system of claim 1, wherein:
the hearing device is further configured to determine an overall SPL of the ipsilateral audio signal; and
the determining that the audio content comprises own voice content is further based on the overall SPL of the ipsilateral audio signal.

5. The hearing system of claim 1, wherein:
the hearing device is further configured to determine, based on the ipsilateral audio signal, that the audio content includes speech content; and
the determining that the audio content comprises own voice content is further based on the determining that the audio content includes speech content.

6. The hearing system of claim 1, wherein:
the ipsilateral microphone is configured to detect an additional ipsilateral audio signal representative of additional audio content;
the contralateral microphone is configured to detect an additional contralateral audio signal representative of the additional audio content; and
the hearing device is further configured to:
determine that an additional symmetry level between the additional ipsilateral audio signal and the additional contralateral audio signal is less than the threshold symmetry level; and
determine, based on the determining that the additional symmetry level is less than the threshold symmetry level, that the additional audio content does not comprise the own voice content.

7. The hearing system of claim 6, wherein the hearing device is further configured to:
determine a third SPL of the first spectral portion of the additional ipsilateral audio signal;
determine a fourth SPL of the second spectral portion of the additional ipsilateral audio signal; and
adjust, based on the determining that the additional audio content does not comprise the own voice content, the threshold SPL amount based on a difference between the third SPL and the fourth SPL.

8. The hearing system of claim 7, wherein the adjusting the threshold SPL amount comprises using a machine learning algorithm.

9. The hearing system of claim 1, wherein:
the ipsilateral microphone is configured to detect an additional ipsilateral audio signal representative of additional audio content;
the contralateral microphone is configured to detect an additional contralateral audio signal representative of the additional audio content; and
the hearing device is further configured to:
determine a third SPL of the first spectral portion of the additional ipsilateral audio signal;
determine a fourth SPL of the second spectral portion of the additional ipsilateral audio signal;
determine that the third SPL is greater than the fourth SPL by less than the threshold SPL amount; and
determine, based on the determining that the third SPL is greater than the fourth SPL by less than the threshold SPL amount, that the additional audio content does not comprise the own voice content.

10. The hearing system of claim 9, wherein:
the hearing device is further configured to determine that an additional symmetry level between the additional ipsilateral audio signal and the additional contralateral audio signal is at least the threshold symmetry level; and
the determining that the additional audio content does not comprise the own voice content is despite the determining that the additional symmetry level is at least the threshold symmetry level.

11. The hearing system of claim 9, wherein the hearing device is further configured to adjust, based on a difference between the third SPL and the fourth SPL, the threshold SPL amount.

12. The hearing system of claim 11, wherein the adjusting the threshold SPL amount comprises using a machine learning algorithm.

13. The hearing system of claim 1, wherein the hearing device comprises the ipsilateral microphone.

14. The hearing system of claim 1, further comprising an additional hearing device associated with the contralateral ear and comprising the contralateral microphone.

15. A system comprising:
a first hearing device and a second hearing device,
the first hearing device associated with an ipsilateral ear of a user and comprising a first microphone configured to detect an ipsilateral audio signal representative of audio content; and
the second hearing device associated with a contralateral ear of the user and comprising a second microphone configured to detect a contralateral audio signal representative of the audio content;
wherein the first hearing device is configured to:
determine a first sound pressure level (SPL) of a first spectral portion of the ipsilateral audio signal, the first spectral portion having frequencies included in a first frequency range;
determine a second SPL of a second spectral portion of the ipsilateral audio signal, the second spectral portion having frequencies included in a second frequency range that is higher than the first frequency range;
determine that the first SPL is greater than the second SPL by at least a threshold SPL amount;
determine that a symmetry level between the ipsilateral audio signal and the contralateral audio signal is at least a threshold symmetry level; and
determine, based on the determining that the first SPL is greater than the second SPL by at least the threshold SPL amount and the determining that the symmetry level is at least the threshold symmetry level, that the audio content comprises own voice content representative of a voice of the user.

16. The system of claim 15, wherein the second hearing device is configured to:
determine a third SPL of a first spectral portion of the contralateral audio signal;
determine a fourth SPL of a second spectral portion of the contralateral audio signal;
determine that the third SPL is greater than the fourth SPL by at least the threshold SPL amount;
determine that the symmetry level between the ipsilateral audio signal and the contralateral audio signal is at least the threshold symmetry level; and
determine, based on the determining that the third SPL is greater than the fourth SPL by at least the threshold SPL amount and the determining that the symmetry level is at least the threshold symmetry level, that the audio content comprises own voice content representative of a voice of the user.

17. The system of claim 15, wherein:
the first microphone is configured to detect an additional ipsilateral audio signal representative of additional audio content;
the second microphone is configured to detect an additional contralateral audio signal representative of the additional audio content; and
the first hearing device is further configured to:
determine that an additional symmetry level between the additional ipsilateral audio signal and the additional contralateral audio signal is less than the threshold symmetry level; and
determine, based on the determining that the additional symmetry level is less than the threshold symmetry level, that the additional audio content does not comprise the own voice content.

18. The system of claim 17, wherein the first hearing device is further configured to:
determine a third SPL of the first spectral portion of the additional ipsilateral audio signal;
determine a fourth SPL of the second spectral portion of the additional ipsilateral audio signal; and
adjust, based on the determining that the additional audio content does not comprise the own voice content, the threshold SPL amount based on a difference between the third SPL and the fourth SPL.

19. The system of claim 15, wherein:
the first microphone is configured to detect an additional ipsilateral audio signal representative of additional audio content;
the second microphone is configured to detect an additional contralateral audio signal representative of the additional audio content; and
the first hearing device is further configured to:
determine a third SPL of the first spectral portion of the additional ipsilateral audio signal;
determine a fourth SPL of the second spectral portion of the additional ipsilateral audio signal;
determine that the third SPL is greater than the fourth SPL by less than the threshold SPL amount; and
determine, based on the determining that the third SPL is greater than the fourth SPL by less than the threshold SPL amount, that the additional audio content does not comprise the own voice content.

20. A method comprising:
determining, by a hearing device associated with an ipsilateral ear of a user, a first sound pressure level (SPL) of a first spectral portion of an ipsilateral audio signal representative of audio content, the first spectral portion having frequencies included in a first frequency range;
determining, by the hearing device, a second SPL of a second spectral portion of the ipsilateral audio signal, the second spectral portion having frequencies included in a second frequency range that is higher than the first frequency range;
determining, by the hearing device, that the first SPL is greater than the second SPL by at least a threshold SPL amount;
determining, by the hearing device, that a symmetry level between the ipsilateral audio signal and a contralateral audio signal representative of the audio content is at least a threshold symmetry level; and
determining, based on the determining that the first SPL is greater than the second SPL by at least the threshold SPL amount and the determining that the symmetry level is at least the threshold symmetry level, that the audio content comprises own voice content representative of a voice of the user.

* * * * *